United States Patent
Pever et al.

(10) Patent No.: US 10,714,921 B1
(45) Date of Patent: Jul. 14, 2020

(54) BUSWAY TAP OFF SYSTEM FOR CONNECTING AN ELECTRICAL SUPPLY TO A DISTRIBUTION DEVICE

(71) Applicant: Siemens Industry, Inc., Alpharetta, GA (US)

(72) Inventors: Steven E. Pever, Simpsonville, SC (US); Timothy J. Fink, Woodruff, SC (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/529,345

(22) Filed: Aug. 1, 2019

(51) Int. Cl.
  *H01R 13/44* (2006.01)
  *H02G 11/00* (2006.01)

(52) U.S. Cl.
  CPC ............. *H02G 11/00* (2013.01); *H01R 13/44* (2013.01)

(58) Field of Classification Search
  CPC ................................ H02G 11/00; H01R 13/44
  See application file for complete search history.

(56) References Cited

U.S. PATENT DOCUMENTS

| | | | | |
|---|---|---|---|---|
| 4,032,821 A * | 6/1977 | Keiser | ..................... | E04F 17/08 361/622 |
| 4,121,276 A * | 10/1978 | Kovatch | ................... | H02B 1/21 174/71 B |
| 4,176,243 A * | 11/1979 | Kovatch | ................... | H02B 1/21 174/72 B |
| 4,728,752 A | 3/1988 | Hicks et al. | | |
| 5,486,651 A * | 1/1996 | Morgan | .................. | H02G 5/007 174/129 B |
| 5,760,339 A | 6/1998 | Faulkner et al. | | |
| 5,783,779 A | 7/1998 | Graham et al. | | |
| 5,811,733 A | 9/1998 | Flaig | | |
| 6,435,888 B1 | 8/2002 | Reed, Jr. | | |
| 6,870,103 B1 * | 3/2005 | Wiant | ..................... | H02G 5/007 174/68.2 |
| 7,759,577 B1 * | 7/2010 | Morales | .................. | H02G 5/002 174/133 B |
| 8,379,374 B2 * | 2/2013 | Keegan | ................ | H01R 25/142 174/68.2 |
| 8,550,830 B1 | 10/2013 | Bhathija et al. | | |
| 9,190,791 B1 | 11/2015 | Jaena et al. | | |
| 9,407,079 B1 | 8/2016 | Kokenda et al. | | |

(Continued)

*Primary Examiner* — Truc T Nguyen

(57) ABSTRACT

A busway tap off system is provided for connecting an electrical supply to a distribution device. The busway tap off system comprises a joint mounted tap box configured for making an electrical connection between an electrical busway and a power distribution system including a downstream panel. The joint mounted tap box is a dynamically mounted electrical equipment and the downstream panel is a rigidly mounted electrical equipment. The busway tap off system further comprises electrical cables that connect the two equipments. The busway tap off system further comprises a nipple accessory that provides a flexible mechanical and electrical connection between the dynamically mounted electrical equipment and the rigidly mounted electrical equipment. The nipple accessory is configured as a rigidly-constructed flexible fitting that includes two axial slides that enable the nipple accessory to move with the dynamically mounted electrical equipment yet remains fixed to the rigidly mounted electrical equipment.

20 Claims, 8 Drawing Sheets

(56) References Cited

U.S. PATENT DOCUMENTS

| | | | |
|---|---|---|---|
| 9,520,703 B2 | 12/2016 | Jaena et al. | |
| 9,590,405 B1 | 3/2017 | Maurer et al. | |
| 9,590,406 B1 | 3/2017 | Maurer et al. | |
| 9,698,548 B2 | 7/2017 | Jaena et al. | |
| 9,705,299 B1 | 7/2017 | Maurer et al. | |
| 9,705,300 B1 | 7/2017 | Maurer et al. | |
| 2004/0100785 A1* | 5/2004 | Josten | H02B 1/21 361/828 |
| 2011/0075326 A1* | 3/2011 | Barnas | H02B 1/056 361/624 |
| 2011/0132635 A1 | 6/2011 | Lesieur et al. | |
| 2011/0136362 A1 | 6/2011 | O'Leary et al. | |
| 2011/0246014 A1* | 10/2011 | Sauper | B60L 53/16 701/22 |
| 2015/0372461 A1* | 12/2015 | Romero Legorreta | H02B 1/30 361/612 |
| 2016/0118186 A1* | 4/2016 | Frimpong | H01F 27/025 307/119 |
| 2016/0126027 A1* | 5/2016 | Pearce | H01H 9/26 361/615 |
| 2019/0103717 A1* | 4/2019 | Pever | H02G 5/007 |

\* cited by examiner

BUSWAY TAP OFF SYSTEM FOR CONNECTING AN ELECTRICAL SUPPLY TO A DISTRIBUTION DEVICE

BACKGROUND

1. Field

Aspects of the present invention generally relate to a busway tap off system for connecting an electrical supply to a distribution device.

2. Description of the Related Art

Commercial and industrial power distribution systems may use several methods to deliver and distribute electrical energy. These methods may include heavy conductor cables run in trays or conduit. Unfortunately, once installed, cable and conduit assemblies are difficult to change.

Electrical power may also be distributed using conductors or "bus bars" in an enclosure. This arrangement is referred to as a busway. A busway is understood in the industry as a prefabricated electrical power distribution system having bus bars in a protective enclosure, and may include straight lengths, fittings, devices, and accessories.

Busway-based power distribution systems may be used for many electrical power distribution applications including, for example, industrial settings and high-rise buildings. In many settings, space for electrical power distribution may be at a premium, particularly in high-rise buildings. Methods and apparatus for reducing space requirements of electrical power distribution systems are desirable.

A Joint Mounted Tap Box is a reliable system for making electrical connections between high current electrical busyways and power distribution systems. The Joint Mounted Tap Box nipple provides a flexible mechanical connection system whereby thermally dynamic system(s) can be reliably connected with rigidly mounted systems. Various manufacturers offer "flexible solutions" which offer up to 6 degrees of freedom but are not UL listed.

Therefore, there is a need for a system configured for making an electrical connection between an electrical busway and a power distribution system.

SUMMARY

Briefly described, aspects of the present invention relate to systems and methods for connecting electrical supply and distribution devices. A system configured for making an electrical connection between an electrical busway and a power distribution system is provided. In particular, a busway tap off system for connecting an electrical supply to a distribution device is provided. The busway tap off system comprises a joint mounted tap box and a nipple accessory. The nipple accessory is designed to protect electrical conductors that connect dynamically mounted systems that are both mechanically and electrically connected to rigidly mounted electrical systems. The nipple accessory is rigidly constructed having two axial slides that enable it to move with the dynamic system yet remains fixed to the rigid system while preserving the integrity and functionality of the electrical cables that connect the two systems. Movement of an electrical system is allowed while maintaining structural and electrical integrity. The nipple accessory is UL/CSA Listed as an accessory under ANCE (UL) Std. 857 for Busways. This solution is evaluated as a suitably rigid system while allowing movement in two axes offering four degrees of freedom. A qualified nipple system is provided for making connections between dynamic and rigid systems (qualified meaning compliant with NEC guidelines, and meeting UL requirements specifically Std. 857 for Busway and Std. 870 rigidity requirements).

In accordance with one illustrative embodiment of the present invention, a busway tap off system is provided for connecting an electrical supply to a distribution device. The busway tap off system comprises a joint mounted tap box configured for making an electrical connection between an electrical busway and a power distribution system including a downstream panel. The joint mounted tap box is a dynamically mounted electrical equipment and the downstream panel is a rigidly mounted electrical equipment. The busway tap off system further comprises one or more electrical cables that connect the dynamically mounted electrical equipment to the rigidly mounted electrical equipment. The busway tap off system further comprises a nipple accessory having a flexible mechanical and electrical connection between the dynamically mounted electrical equipment and the rigidly mounted electrical equipment. The nipple accessory is configured as a rigidly-constructed flexible fitting that includes two axial slides that enable the nipple accessory to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

In accordance with another illustrative embodiment of the present invention, a method of connecting an electrical supply to a distribution device via a busway tap off system is provided. The method comprises providing a joint mounted tap box configured for making an electrical connection between an electrical busway and a power distribution system including a downstream panel. The joint mounted tap box is a dynamically mounted electrical equipment and the downstream panel is a rigidly mounted electrical equipment. The method further comprises providing one or more electrical cables that connect the dynamically mounted electrical equipment to the rigidly mounted electrical equipment. The method further comprises providing a nipple accessory having a flexible mechanical and electrical connection between the dynamically mounted electrical equipment and the rigidly mounted electrical equipment. The nipple accessory is configured as a rigidly-constructed flexible fitting that includes two axial slides that enable the nipple accessory to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

DETAILED DESCRIPTION

Figure 1:
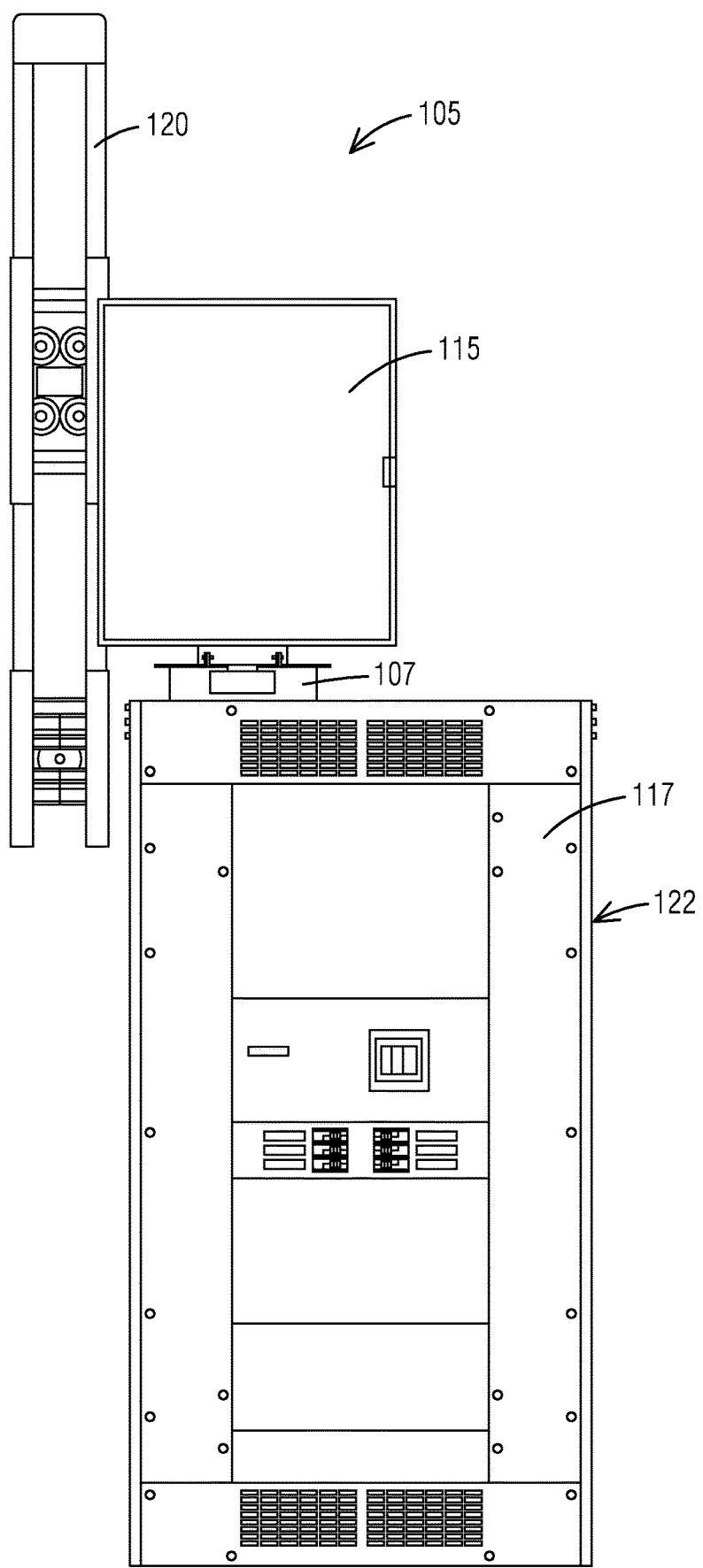
FIG. 1 illustrates a block diagram of a busway tap off system for a vertical busway application that uses a nipple accessory configured as a rigidly-constructed flexible fitting between a dynamically mounted electrical equipment and a rigidly mounted electrical equipment in accordance with an exemplary embodiment of the present invention.

To facilitate an understanding of embodiments, principles, and features of the present invention, they are explained hereinafter with reference to implementation in illustrative embodiments. In particular, they are described in the context of busway systems for electrical power distribution. A nipple accessory configured as a rigidly-constructed flexible fitting is provided for use in an electrical power distribution system. A busway tap off system connects an electrical supply to a distribution device. The busway tap off system comprises a joint mounted tap box and a nipple accessory. The nipple accessory is disposed between a dynamically mounted electrical equipment and a rigidly mounted electrical equipment. The joint mounted tap box is the dynamically mounted electrical equipment and a downstream panel is the rigidly mounted electrical equipment. The joint mounted tap box is configured for making an electrical connection between an electrical busway and a power distribution system including the downstream panel. The nipple accessory provides a flexible mechanical and electrical connection between the dynamically mounted electrical equipment and the rigidly mounted electrical equipment. The nipple accessory includes two axial slides that enable the nipple accessory to move with the dynamically mounted electrical equipment yet remains fixed to the rigidly mounted electrical equipment. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the busway tap off system according to the present disclosure are described below with reference to FIGS. 1-24 herein. Like reference numerals used in the drawings identify similar or identical elements throughout the several views. The drawings are not necessarily drawn to scale.

Consistent with one embodiment of the present invention, FIG. 1 represents a representation of a block diagram of a busway tap off system 105 for a vertical busway application that uses a nipple accessory 107 configured as a rigidly-constructed flexible fitting between a dynamically mounted electrical equipment and a rigidly mounted electrical equipment in accordance with an exemplary embodiment of the present invention. The busway tap off system 105 is used where a combination of random telescopic, sliding and pivoting movements of a system must be considered and wherein a rigid structure is required to protect and prevent access to live components. The busway tap off system 105 is used where components are required to comply with agency and industry standards (i.e. UL, ANCE, cUL, NFPA70, National Electrical Code (NEC) etc.).

The main purpose of the busway tap off system 105 is to preserve structural and electrical integrity of a power distribution system in a high rise structure. For example, one of the applications of the busway tap off system 105 is in multi-story buildings with vertically installed power distribution systems (busway). One of the functions of the nipple accessory 107 is a provision for allowing thermal expansion and contraction of a busway (the dynamically mounted equipment) in a power distribution system while preserving the integrity of structural or electrical connections with panelboards, meter centers, and other equipment that may be bolted to floors walls, ceilings or otherwise secured to immoveable structures.

The busway tap off system 105 comprises a joint mounted tap box 115 and the nipple accessory 107. The nipple accessory 107 is disposed between the dynamically mounted electrical equipment and the rigidly mounted electrical equipment. The joint mounted tap box 115 is the dynamically mounted electrical equipment and a downstream panel 117 is the rigidly mounted electrical equipment. The joint mounted tap box 115 is configured for making an electrical connection between an electrical busway 120 and a power distribution system 122 including the downstream panel 117.

The busway tap off system 105 further comprises one or more electrical cables (not seen but going through the nipple accessory 107) that connect the dynamically mounted electrical equipment to the rigidly mounted electrical equipment. The nipple accessory 107 provides a flexible mechanical and electrical connection between the dynamically mounted electrical equipment and the rigidly mounted electrical equipment. The nipple accessory 107 includes two axial slides (seen in later figures) that enable the nipple accessory 107 to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

The nipple accessory 107 enables movement of an electrical system while maintaining structural and electrical integrity. In one embodiment, the nipple accessory 107 is a combination of rigidly assembled metal components having a length less than 24" and having planar mounting surfaces at either end. The nipple accessory 107 provides a rigid system while allowing movement in at least two axes thus offering four degrees of freedom. The nipple accessory 107 includes a nipple component that is a tubular rigid metal polygon constructed wherein flat opposed sides and perpendicular (angled) flanges of each side present sliding planes, walls and edges which are used to limit the vector and magnitude of any combination of movements of a rigidly assembled metal slide plate and slide box components of the nipple accessory 107.

The nipple accessory 107 prevents access to live electrical components per various UL standards for electrical equipment. Components of the nipple accessory 107 are constructed with a multiplicity of flanges, walls and edges which allow movement in a combination of directions while preventing contact with live electrical components housed within the nipple accessory 107. The nipple accessory 107 is securely connected to a dynamically moveable electrical housing at one end and a rigidly mounted electrical housing at another end.

Figure 2:
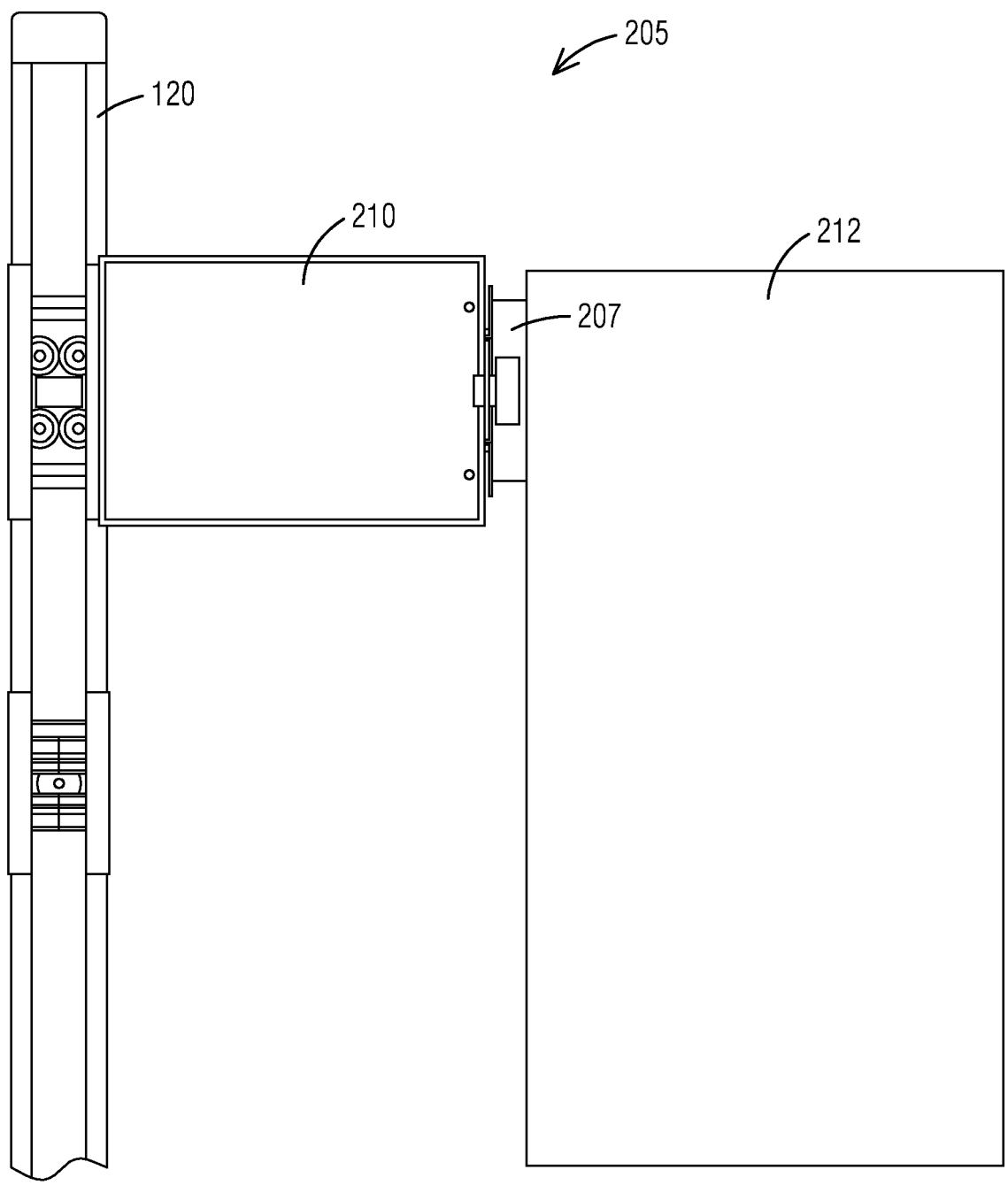
FIG. 2 illustrates a block diagram of a busway tap off system for a horizontal application (busway) that uses a nipple accessory configured as a rigidly-constructed flexible fitting between a dynamically mounted electrical equipment and a rigidly mounted electrical equipment in accordance with an exemplary embodiment of the present invention.

Referring to FIG. 2, it illustrates a block diagram of a busway tap off system 205 for a horizontal application (busway) that uses a nipple accessory 207 configured as a rigidly-constructed flexible fitting between a dynamically mounted electrical equipment 210 and a rigidly mounted electrical equipment 212 in accordance with an exemplary embodiment of the present invention.

Figure 3:
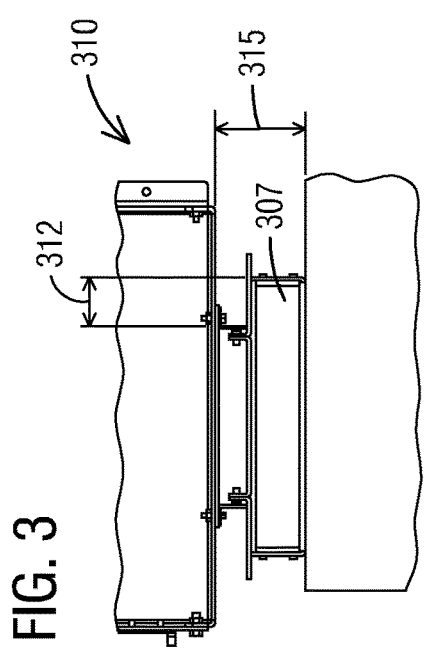
FIG. 3 illustrates a diagrammatic view of a nipple accessory and its limits of motion from a nominal installed position in accordance with an exemplary embodiment of the present invention.

Turning now to FIG. 3, it illustrates a diagrammatic view of a nipple accessory 307 and its limits of motion from a nominal installed position 310 in accordance with an exemplary embodiment of the present invention. According to one embodiment, the nominal installed position 310 is defined by a lateral position 312 with 2.06 inch offset and a linear extension position 315 with 4.00 inch offset. Angular movements up to +/−10 degrees in any orientation about an axis perpendicular with the enclosure mounting surfaces of the nipple accessory 307 are permitted.

Figure 4:
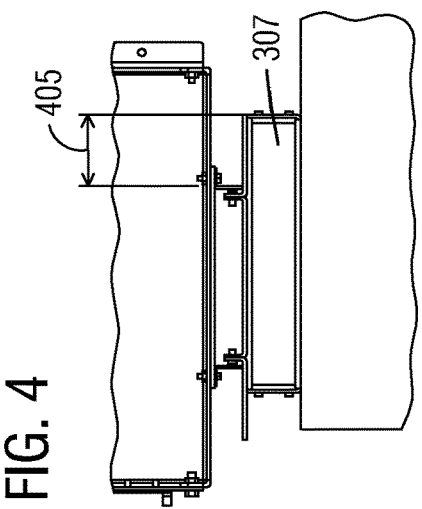
FIG. 4 illustrates a diagrammatic view of a left lateral limit of a nipple accessory in accordance with an exemplary embodiment of the present invention.

FIG. 4 illustrates a diagrammatic view of a left lateral limit 405 of the nipple accessory 307 in accordance with an exemplary embodiment of the present invention. For example, the left lateral limit 405 may be 3.06 inch., meaning 1.00 inch travel or movement from the lateral position 312 of the nominal installed position 310.

Figure 5:
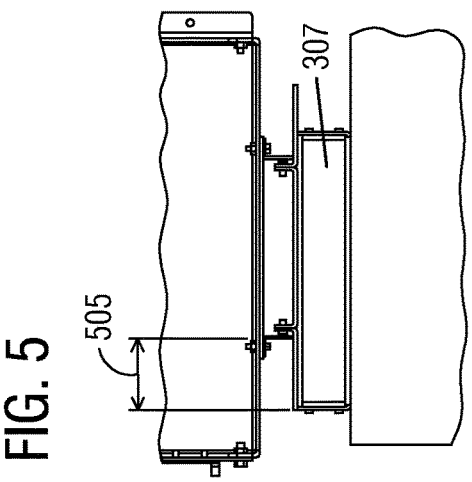
FIG. 5 illustrates a diagrammatic view of a right lateral limit of a nipple accessory in accordance with an exemplary embodiment of the present invention.

As seen in FIG. 5, it illustrates a diagrammatic view of a right lateral limit 505 of the nipple accessory 307 in accordance with an exemplary embodiment of the present invention. For example, the right lateral limit 505 may be 3.06 inch., meaning 1.00 inch travel or movement from a lateral position on a left side of the nominal installed position 310.

Figure 6:
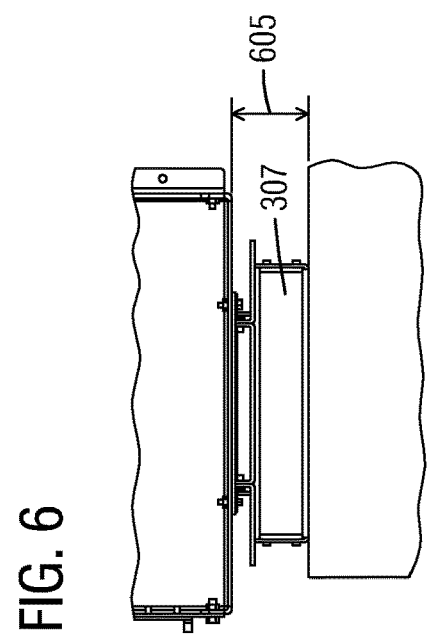
FIG. 6 illustrates a diagrammatic view of a minimum linear extension limit of a nipple accessory in accordance with an exemplary embodiment of the present invention.

As shown in FIG. 6, it illustrates a diagrammatic view of a minimum linear extension limit 605 of the nipple accessory 307 in accordance with an exemplary embodiment of the present invention. For example, the minimum linear extension limit 605 may be 3.38 inch., meaning 0.62 inch travel or movement from the linear extension position 315 of the nominal installed position 310.

Figure 7:
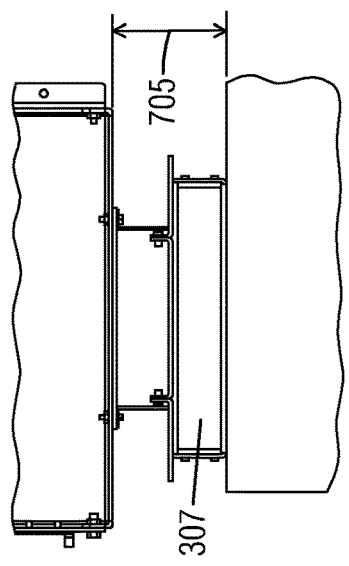
FIG. 7 illustrates a diagrammatic view of a maximum linear extension limit of a nipple accessory in accordance with an exemplary embodiment of the present invention.

In FIG. 7, it illustrates a diagrammatic view of a maximum linear extension limit 705 of the nipple accessory 307 in accordance with an exemplary embodiment of the present invention. For example, the maximum linear extension limit 705 may be 5.00 inch, meaning 1.00 inch travel or movement from the linear extension position 315 of the nominal installed position 310.

Figure 8:
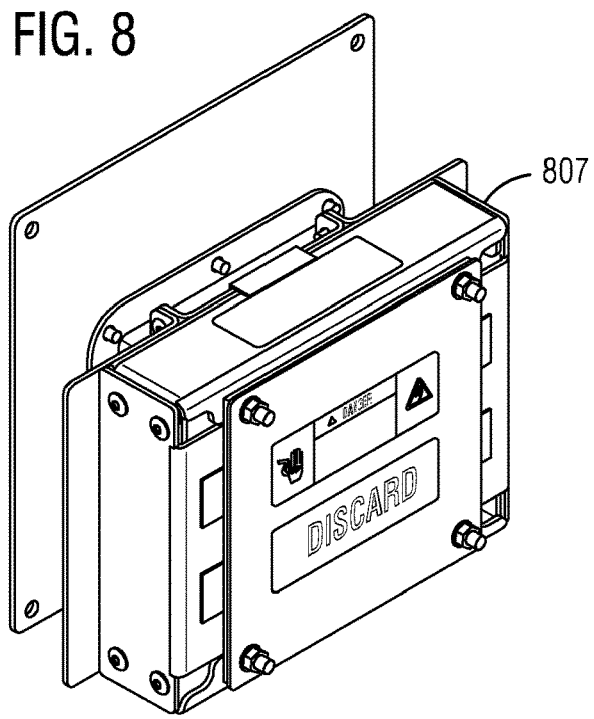
FIG. 8 illustrates a diagrammatic view of a first embodiment of a nipple accessory in accordance with an exemplary embodiment of the present invention.
Figure 9:
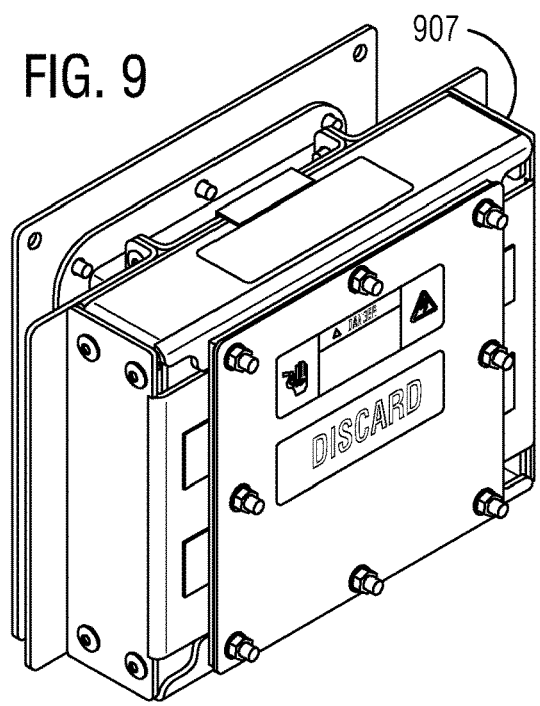
FIG. 9 illustrates a diagrammatic view of a second embodiment of a nipple accessory in accordance with an exemplary embodiment of the present invention.
Figure 10:
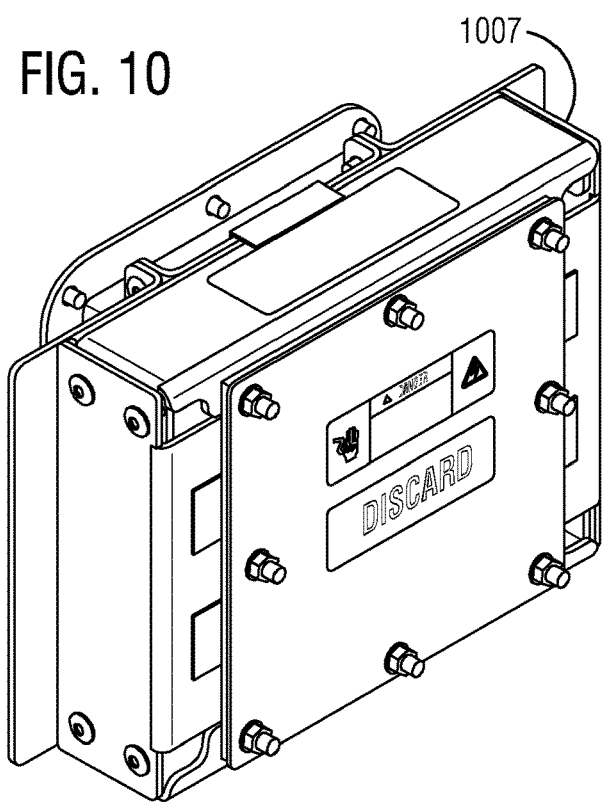
FIG. 10 illustrates a diagrammatic view of a third embodiment of a nipple accessory in accordance with an exemplary embodiment of the present invention.

With regard to FIG. 8, it illustrates a diagrammatic view of a first embodiment of an assembled nipple accessory 807 (shown not installed on equipment) in accordance with an exemplary embodiment of the present invention. With respect to FIG. 9, it illustrates a diagrammatic view of a second embodiment of an assembled nipple accessory 907 (shown not installed on equipment) in accordance with an exemplary embodiment of the present invention. FIG. 10 illustrates a diagrammatic view of a third embodiment of an assembled nipple accessory 1007 (shown not installed on equipment) in accordance with an exemplary embodiment of the present invention.

Figure 11:
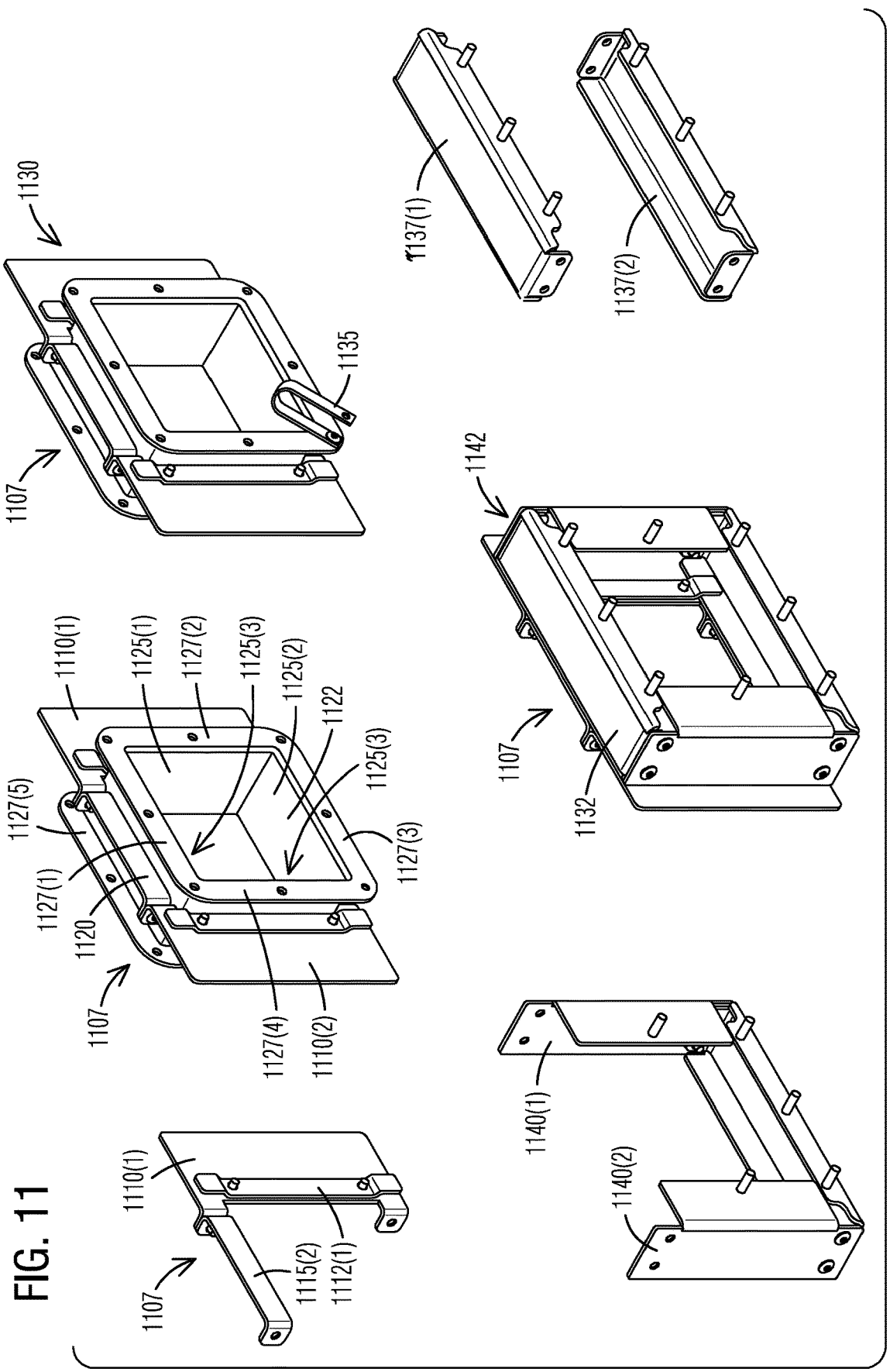
FIG. 11 illustrates a partial exploded view of a nipple accessory in accordance with an exemplary embodiment of the present invention.

FIG. 11 illustrates a partial exploded view of a nipple accessory 1107 in accordance with an exemplary embodiment of the present invention. The nipple accessory 1107 includes a first lateral slide plate and a second lateral slide plate 1110(1-2), a first guide bar and a second guide bar 1112(1-2) and a first connector strap and a second connector strap 1115(1-2) that form a lateral slide plate assembly 1120. The nipple accessory 1107 includes a nipple component 1122 that is a tubular rigid metal polygon constructed wherein flat opposed sides 1125(1-4) and perpendicular (angled) flanges 1127(1-8) of each side 1125 present sliding planes, walls and edges which are used to limit the vector and magnitude of any combination of movements of a rigidly assembled metal slide plate 1130 and a slide box assembly 1132 components of the nipple accessory 1107. The nipple accessory 1107 provides a wireway slot to pass through electrical cables (not shown).

The nipple accessory 1107 further includes a ground strap 1135 rivetted onto the nipple component 1122. The nipple accessory 1107 further includes a first guide rail and a second guide rail 1137(1-2) each with treaded studs. The nipple accessory 1107 further includes a first stop plate and a second stop plate 1140(1-2) each with treaded studs. The first guide rail and the second guide rail 1137(1-2) and the first stop plate and the second stop plate 1140(1-2) form the slide box assembly 1132.

The nipple accessory 1107 comprises the slide box assembly 1132 that combines a linear motion slide box frame 1142 with the lateral slide plate assembly 1120 to promote movements in a combination of directions. The nipple accessory 1107 further comprises the slide box assembly 1132 that is a portion of the nipple accessory 1107 that captures the nipple component 1122, attaches to an adjacent equipment enclosure and limits vector and magnitude of positive and negative movements. The slide box assembly 1132 controls positive and negative movements with 3 degrees of freedom.

The slide box assembly 1132 is a square (polygon) shaped assembly comprised of the linear motion slide box frame 1142 and the lateral slide plate assembly 1120. The slide box assembly 1132 allows yet limits a combination of angular, linear and/or lateral movements. The slide box frame 1142 is comprised of two opposing guide rails 1137(1-2) and two opposing stop plates 1140(1-2). The guide rail 1137 is a rectangular metal plate each having perpendicularly oriented walls that serve as guide flanges along either edge of its length and each having a secondary pair of opposing perpendicular walls at either end that serve as attachment with the guide rails 1137(1-2). The stop plate 1140 is a rectangular metal plate having a single perpendicular wall along one edge at the center portion of its length that serves as a stop for lateral and angular movements. The slide box assembly 1132 is constructed to capture the nipple component 1122 resulting in a permanently connected yet flexible assembly for housing electrical cables.

The nipple accessory 1107 further comprises the slide box assembly 1132 that is a portion of the nipple accessory 1107 that captures the nipple component 1122, attaches to an adjacent equipment enclosure and limits vector and magnitude of positive and negative movements. The slide box assembly 1132 controls positive and negative movements with 3 degrees of freedom. The slide box assembly 1132 maintains structural and electrical integrity of the busway tap off system 105 while being subjected to combined linear (telescopic), lateral (sliding) and angular (pivoting) movements. The slide box assembly 1132 is constructed with a combination of pieces having walls and edges that operate in close proximity allowing angular, linear and lateral movements while preventing an opening that could allow human access to live electrical components during normal movement and in the event of an electrical short circuit event.

The nipple accessory 1107 prevents access to live electrical components per various UL standards for electrical equipment. Components of the nipple accessory 1107 are constructed with a multiplicity of flanges, walls and edges which allow movement in a combination of directions while preventing contact with live electrical components housed within the nipple accessory 1107. The nipple accessory 1107 is securely connected to a dynamically moveable electrical housing at one end and a rigidly mounted electrical housing at another end.

The nipple accessory 1107 includes two axial slides (a first lateral slide plate and a second lateral slide plate 1110(1-2)) that enable the nipple accessory 1107 to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

Figure 12:
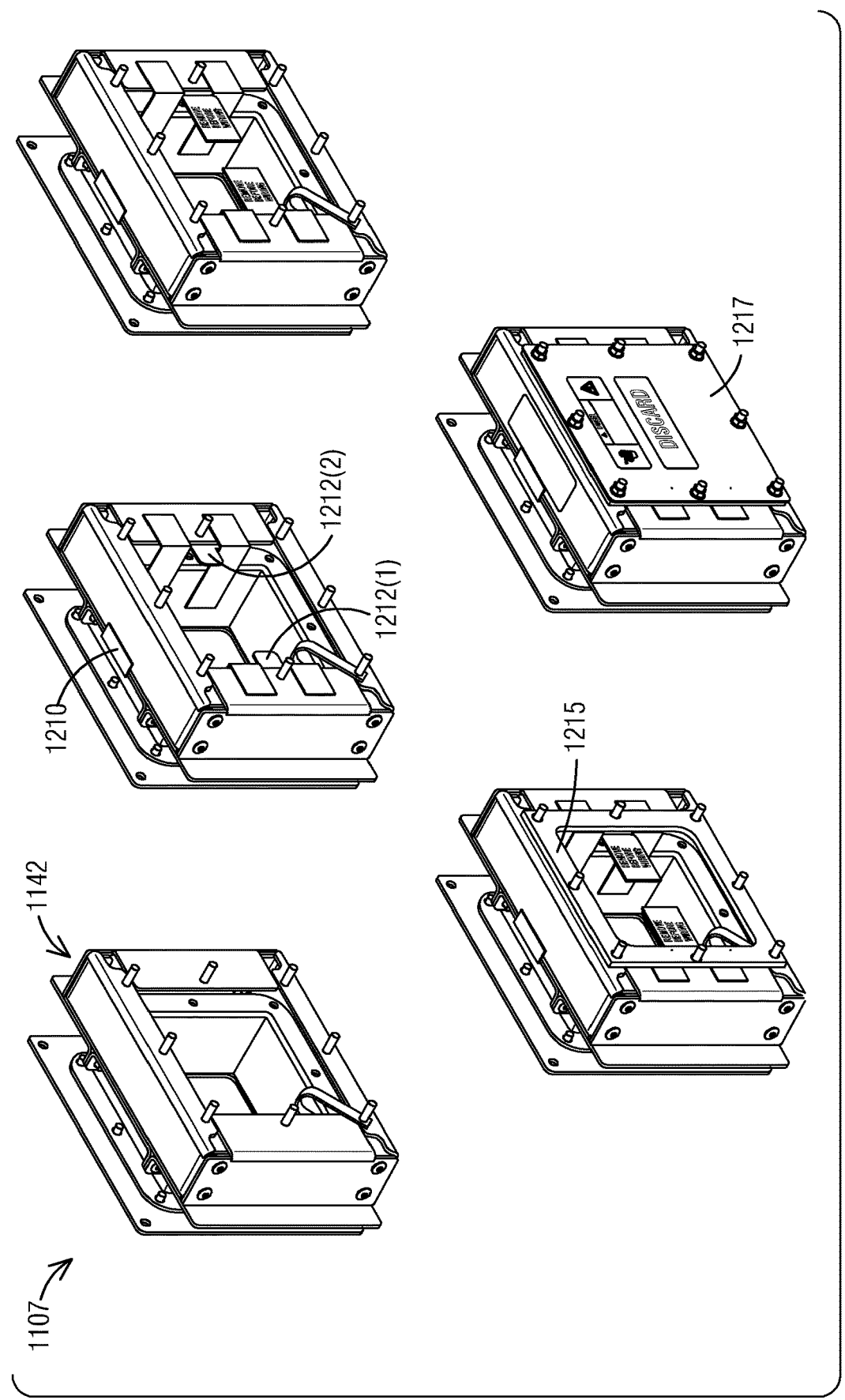
FIG. 12 illustrates a partial exploded view of the nipple accessory of FIG. 11 in accordance with an exemplary embodiment of the present invention.

FIG. 12 illustrates a partial exploded view of the nipple accessory 1107 of FIG. 11 in accordance with an exemplary embodiment of the present invention. The nipple accessory 1107 further comprises an adapter plate 1205. A central lateral slide (a first lateral slide plate and a second lateral slide plate 1110(1-2)) with the slide box assembly 1132 is then placed with a tape 1210. The nipple accessory 1107 further comprises first and second nominal position spacers 1212(1-2). The nipple accessory 1107 further comprises an insulator bushing 1215. The nipple accessory 1107 further comprises an electrical safety plate 1217.

In operation, a locked slide box configuration of the slide box assembly 1132 sets a controlled nominal position for the purpose of retaining 3+/− degrees of freedom after unlocking. The nipple accessory 1107 is locked in a nominal position by a combination of spacers and adhesively joined straps until installation into a power distribution system is completed. The locked slide box configuration comprises the slide box assembly 1132 having the removably placed first and second nominal position spacers 1212(1-2) that fix movements of the nipple accessory 1107 in a "neutral" position. The nipple accessory 1107 can then be unlocked by removal of the spacers 1212(1-2) and straps allowing the dynamically mounted portion of the power distribution system to move as it expands and contracts.

The rigid components of the busway tap off system 105 (see FIG. 1) move in combination within a controlled zone while protecting cables and cable connections from being damaged by external impacts or internal short circuit forces. The slide box assembly 1132 is comprised of a combination of components having walls and edges that operate in close proximity yet allowing angular, linear and lateral movements within a limited range of movement (zone) while protecting the cables from damage due to external impacts and protecting humans and external structures from damage in the event of an electrical short circuit within the nipple accessory 1107.

Figure 13:
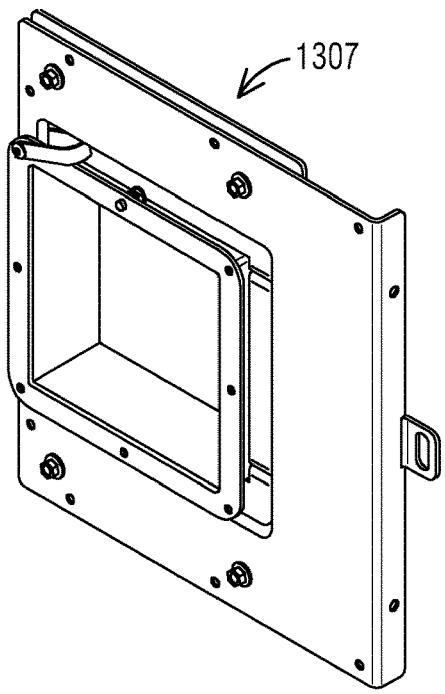
FIG. 13 illustrates a diagrammatic view of a first alternate embodiment of a nipple accessory in accordance with an exemplary embodiment of the present invention.

FIG. 13 illustrates a diagrammatic view of a first alternate embodiment of a nipple accessory 1307 with a relatively large size wireway opening 1310 in accordance with an exemplary embodiment of the present invention. For example, the relatively large size wireway opening 1310 may be 8×8 inches.

Figure 14:
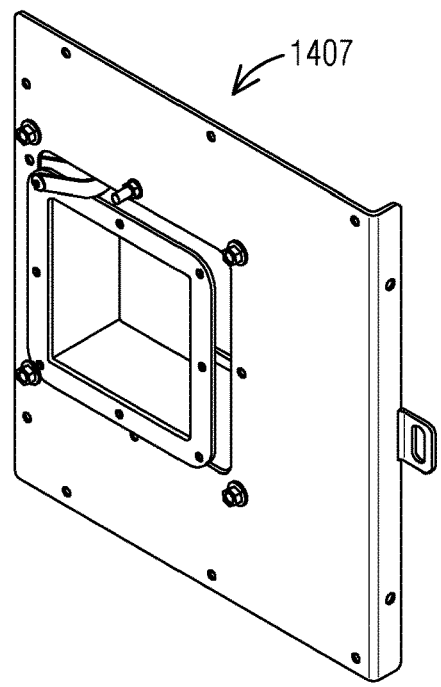
FIG. 14 illustrates a diagrammatic view of a second alternate embodiment of a nipple accessory in accordance with an exemplary embodiment of the present invention.

FIG. 14 illustrates a diagrammatic view of a second alternate embodiment of a nipple accessory 1407 with a relatively medium size wireway opening 1410 in accordance with an exemplary embodiment of the present invention. For example, the relatively medium size wireway opening 1410 may be 6×6 inches.

Figure 15:
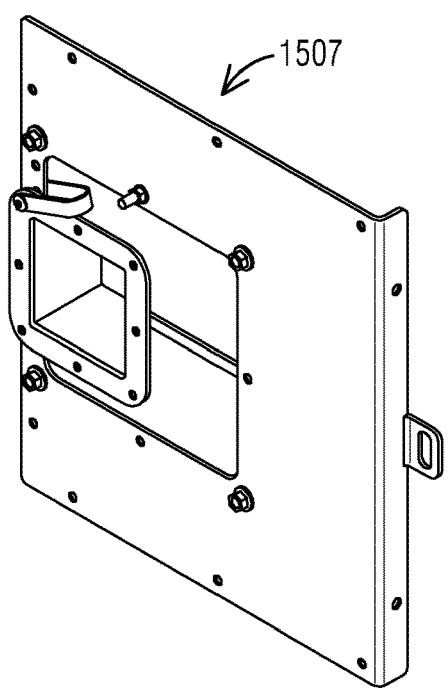
FIG. 15 illustrates a diagrammatic view of a third alternate embodiment of a nipple accessory in accordance with an exemplary embodiment of the present invention.

FIG. 15 illustrates a diagrammatic view of a third alternate embodiment of a nipple accessory 1507 with a relatively small wireway opening 1510 in accordance with an exemplary embodiment of the present invention. For example, the relatively small wireway opening 1510 may be 4×4 inches.

Figure 16:
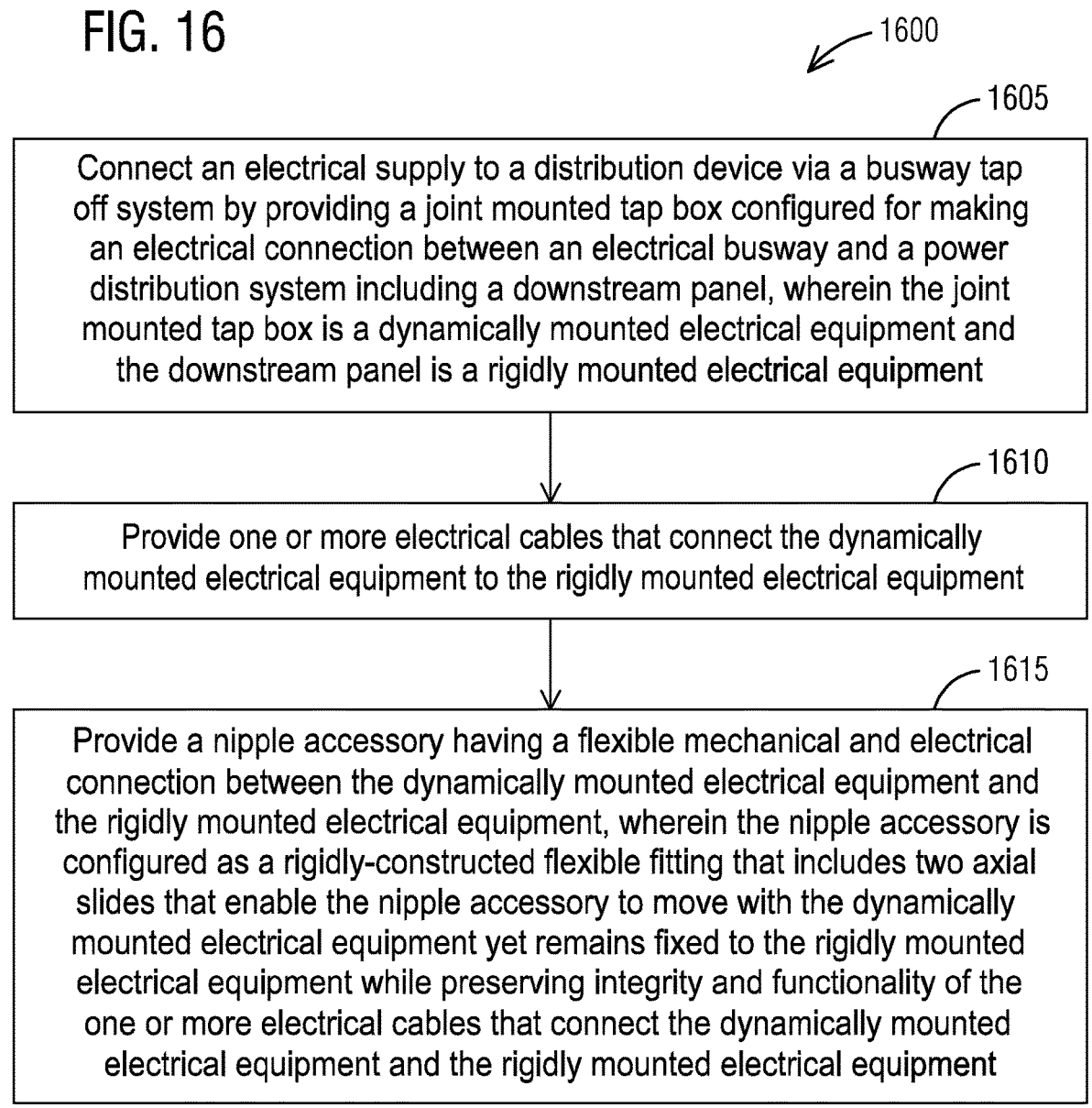
FIG. 16 illustrates a schematic view of a flow chart of a method of connecting an electrical supply to a distribution device via a busway tap off system in accordance with an exemplary embodiment of the present invention.

FIG. 16 illustrates a schematic view of a flow chart of a method 1600 of connecting an electrical supply to a distribution device via the busway tap off system 105 in accordance with an exemplary embodiment of the present invention. Reference is made to the elements and features described in FIGS. 1-15. It should be appreciated that some steps are not required to be performed in any particular order, and that some steps are optional.

For connecting an electrical supply to a distribution device via the busway tap off system 105, the method 1600 in step 1605 provides a joint mounted tap box configured for making an electrical connection between an electrical busway and a power distribution system including a downstream panel. The joint mounted tap box is the dynamically mounted electrical equipment and the downstream panel is the rigidly mounted electrical equipment.

The method 1600 further includes a step 1610 of providing one or more electrical cables that connect the dynamically mounted electrical equipment to the rigidly mounted electrical equipment 115. The method 1600 further includes a step 1615 of providing the nipple accessory 107 that provides a flexible mechanical and electrical connection between the dynamically mounted electrical equipment and the rigidly mounted electrical equipment. The nipple accessory 107 is configured as a rigidly-constructed flexible fitting that includes two axial slides that enable the nipple accessory 107 to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

The busway tap off system 105 inherently protects electrical cables routed between a busway tap off device and a downstream electrical equipment. Industry standard means for protecting cables between such equipment include commercially available wireway and conduit systems. In this disclosure however, additional constraints of space, agency listing, and requirement for managing the effects of naturally occurring thermal movements of energized busway connected to rigidly mounted equipment presented a case for developing a wireway component resembling a "rubber accordion bellows". The nipple accessory 107 as flexible fittings meet the criteria outlined above and are UL and cUL Listed under ANCE/UL Standard 857 for Busway.

The nipple accessory 107 is of metallic, non-ferrous (aluminum) construction. An installed nipple accessory 107 prevents access to live electrical components per various UL standards for electrical equipment. The nipple accessory 107 has provision for maintaining a reliable ground path between equipment as cited in UL 870 for wireways. The nipple accessory 107 features a tamper resistant riveted construction.

The nipple accessory's 107 "Slide Box" design is comprised of a combination of a linear motion slide box frame with lateral slide plate assembly(s) to promote movements in intended direction. The "Slide Box" design controls positive and negative movements with 3 degrees of freedom. The "Slide Box" construction maintains structural and electrical integrity of the system while subjected to combined linear (telescopic), lateral (sliding) and angular (pivoting) movements.

The nipple accessory 107 has a smallest known footprint compared with industry standard flexible connections. The nipple accessory 107 design qualifies for increased cable fill rates as defined by NEC/NFPA 70 in Table 1 Note 4. The nipple accessory 107 may be offered in sizes suited to a range of cable sizes and electrical capacity requirements.

A "Locked" Slide Box design of the nipple accessory 107 sets a controlled nominal position for the purpose of retaining 3+/− degrees of freedom after un-locking. The "Locked" Slide box is comprised of the slide box assembly having removably placed spacers that fix movements of the nipple accessory 107 in a "neutral" position.

The nipple accessory 107 design intends flexibility to perform various factory constructed lengths while supporting field combination with commercially available wireway components. Rigid components move in combination within a controlled zone while protecting cables and cable connections from being damaged by external impacts or internal short circuit forces.

While a square shaped nipple accessory is described here a range of one or more other shapes of nipple accessory or other forms of nipple accessory are also contemplated by the present invention. For example, other types of nipple accessory or other nipple accessory such as non-square (polygon) may be implemented based on one or more features presented above without deviating from the spirit of the present invention.

The techniques described herein can be particularly useful for mounting a distribution device via a joint mounted tap box configured for making an electrical connection between an electrical busway and a power distribution system including the distribution device such as a downstream panel. While particular embodiments are described in terms of a joint mounted tap box being provided as part of a busway tap off system, the techniques described herein are not limited to the joint mounted tap box but can also be used with other electrical structures or equipment.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A busway tap off system for connecting an electrical supply to a distribution device, the busway tap off system comprising:
   a joint mounted tap box configured for making an electrical connection between an electrical busway and a power distribution system including a downstream panel, wherein the joint mounted tap box is a dynamically mounted electrical equipment and the downstream panel is a rigidly mounted electrical equipment;
   one or more electrical cables that connect the dynamically mounted electrical equipment to the rigidly mounted electrical equipment; and
   a nipple accessory having a flexible mechanical and electrical connection between the dynamically mounted electrical equipment and the rigidly mounted electrical equipment, wherein the nipple accessory is configured as a rigidly-constructed flexible fitting that includes two axial slides that enable the nipple accessory to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

2. The busway tap off system of claim 1, wherein the nipple accessory enables movement of an electrical system while maintaining structural and electrical integrity.

3. The busway tap off system of claim 1, wherein the nipple accessory provides a rigid system while allowing movement in at least two axes thus offering four degrees of freedom.

4. The busway tap off system of claim 1, wherein the nipple accessory prevents access to live electrical components per various UL standards for electrical equipment.

5. The busway tap off system of claim 1, wherein the nipple accessory comprises a slide box assembly including a combination of a linear motion slide box frame with a lateral slide plate assembly to promote movements in an intended direction.

6. The busway tap off system of claim 5, wherein the slide box assembly controls positive and negative movements with 3 degrees of freedom.

7. The busway tap off system of claim 5, wherein the slide box assembly maintains structural and electrical integrity of the busway tap off system while being subjected to combined linear (telescopic), lateral (sliding) and angular (pivoting) movements.

8. The busway tap off system of claim 5, wherein a locked slide box configuration of the slide box assembly sets a controlled nominal position for the purpose of retaining 3+/− degrees of freedom after un-locking.

9. The busway tap off system of claim 8, wherein the locked slide box configuration comprises the slide box assembly having removably placed spacers that fix movements of the nipple accessory in a "neutral" position.

10. The busway tap off system of claim 1, wherein rigid components of the busway tap off system move in combination within a controlled zone while protecting cables and cable connections from being damaged by external impacts or internal short circuit forces.

11. A method of connecting an electrical supply to a distribution device via a busway tap off system, the method comprising:
   providing a joint mounted tap box configured for making an electrical connection between an electrical busway and a power distribution system including a downstream panel, wherein the joint mounted tap box is a dynamically mounted electrical equipment and the downstream panel is a rigidly mounted electrical equipment;
   providing one or more electrical cables that connect the dynamically mounted electrical equipment to the rigidly mounted electrical equipment; and
   providing a nipple accessory having a flexible mechanical and electrical connection between the dynamically mounted electrical equipment and the rigidly mounted electrical equipment, wherein the nipple accessory is configured as a rigidly-constructed flexible fitting that includes two axial slides that enable the nipple accessory to move with the dynamically mounted electrical equipment yet remains fixed to the rigidly mounted electrical equipment while preserving integrity and functionality of the one or more electrical cables that connect the dynamically mounted electrical equipment and the rigidly mounted electrical equipment.

12. The method of claim 11, wherein the nipple accessory enables movement of an electrical system while maintaining structural and electrical integrity.

13. The method of claim 11, wherein the nipple accessory provides a rigid system while allowing movement in at least two axes thus offering four degrees of freedom.

14. The method of claim 11, wherein the nipple accessory prevents access to live electrical components per various UL standards for electrical equipment.

15. The method of claim 11, wherein the nipple accessory comprises a slide box assembly including a combination of a linear motion slide box frame with a lateral slide plate assembly to promote movements in an intended direction.

16. The method of claim 15, wherein the slide box assembly controls positive and negative movements with 3 degrees of freedom.

17. The method of claim 15, wherein the slide box assembly maintains structural and electrical integrity of the busway tap off system while being subjected to combined linear (telescopic), lateral (sliding) and angular (pivoting) movements.

18. The method of claim 15, wherein a locked slide box configuration of the slide box assembly sets a controlled nominal position for the purpose of retaining 3+/− degrees of freedom after un-locking.

19. The method of claim 18, wherein the locked slide box configuration comprises the slide box assembly having removably placed spacers that fix movements of the nipple accessory in a "neutral" position.

20. The method of claim 11, wherein rigid components of the busway tap off system move in combination within a controlled zone while protecting cables and cable connections from being damaged by external impacts or internal short circuit forces.

* * * * *